Sept. 23, 1969  F. HUPPMANN  3,468,240
PLANT FOR THE CONTINUOUS PREPARATION OF BREWER'S MASH
AND FOR THE COOKING OF WORT
Filed Sept. 20, 1967  3 Sheets-Sheet 2
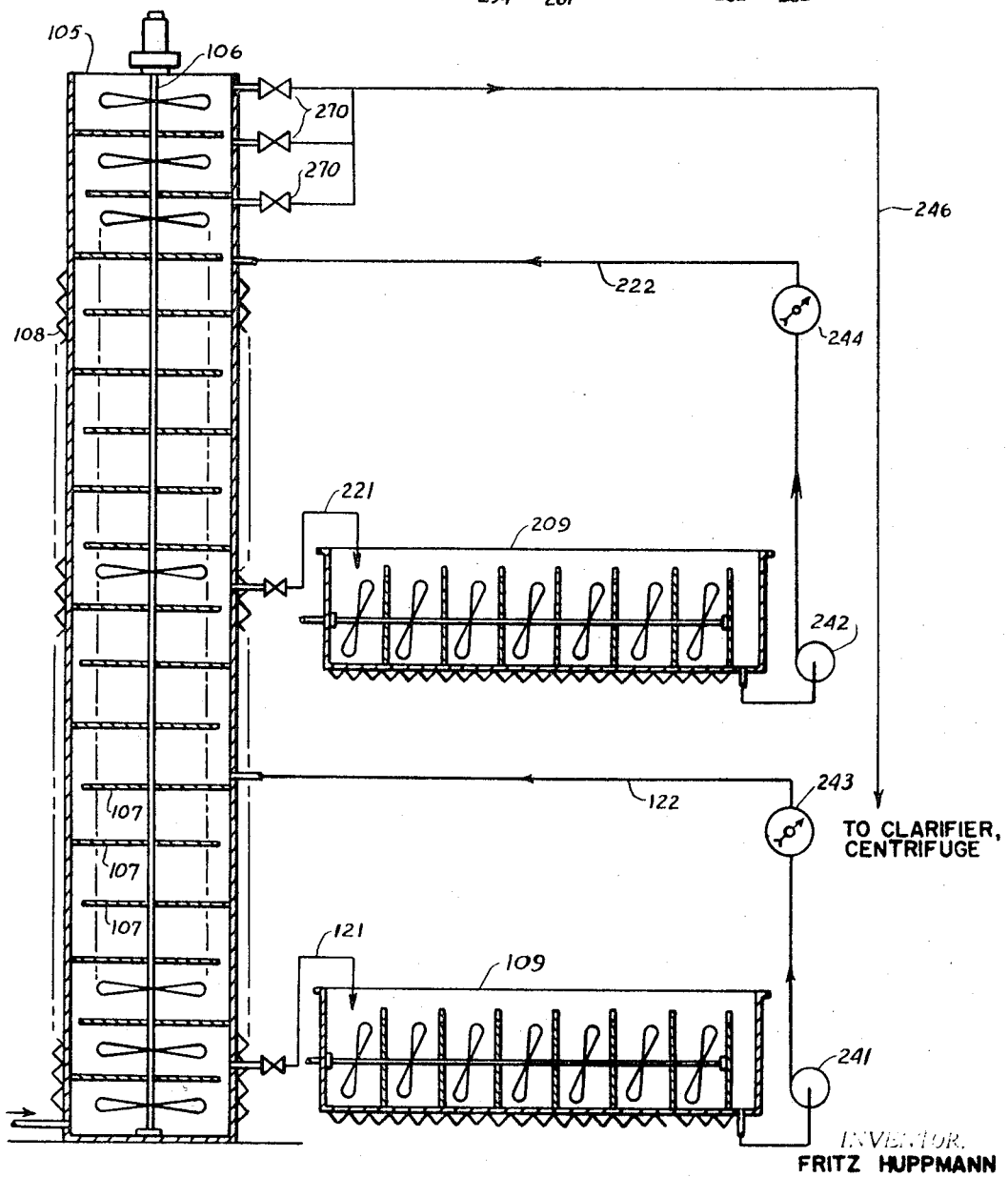
INVENTOR.
FRITZ HUPPMANN
BY James and Franklin
ATTORNEYS Sept. 23, 1969    F. HUPPMANN    3,468,240
PLANT FOR THE CONTINUOUS PREPARATION OF BREWER'S MASH
AND FOR THE COOKING OF WORT
Filed Sept. 20, 1967    3 Sheets-Sheet 3
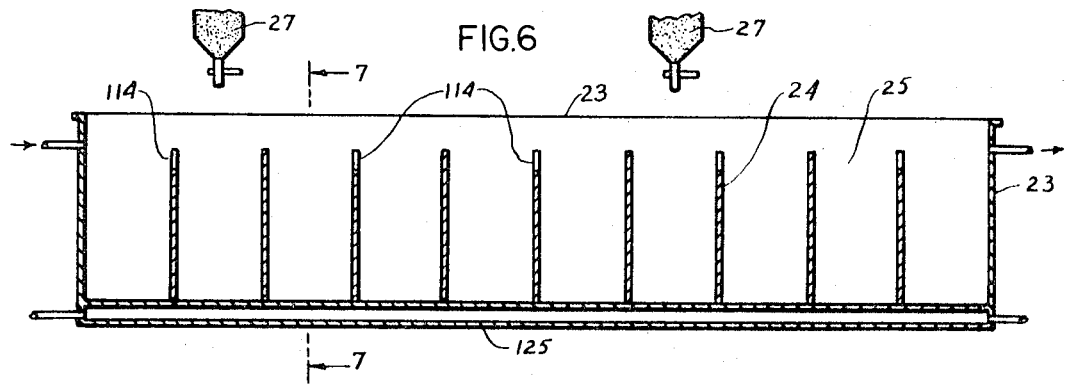
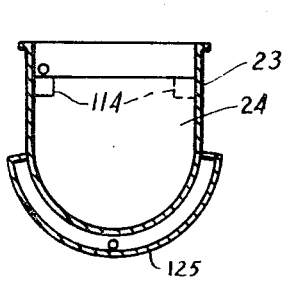
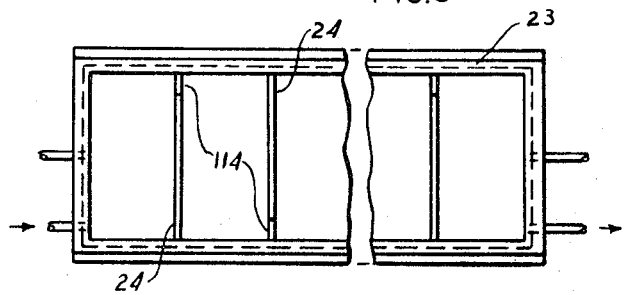
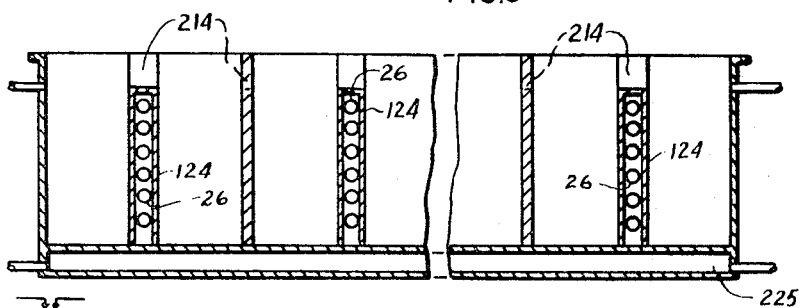
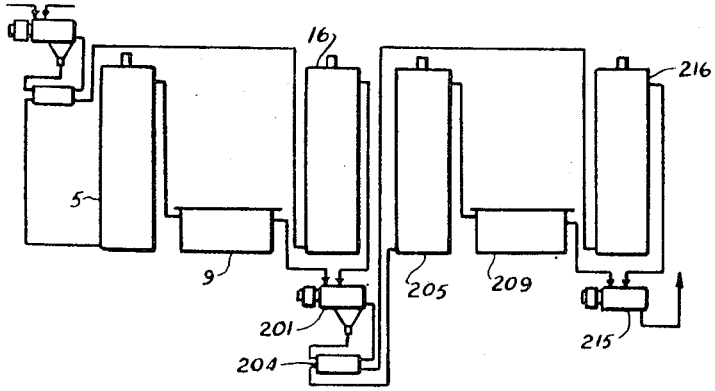
INVENTOR.
FRITZ HUPPMANN
BY James and Franklin
ATTORNEYS United States Patent Office 3,468,240
Patented Sept. 23, 1969

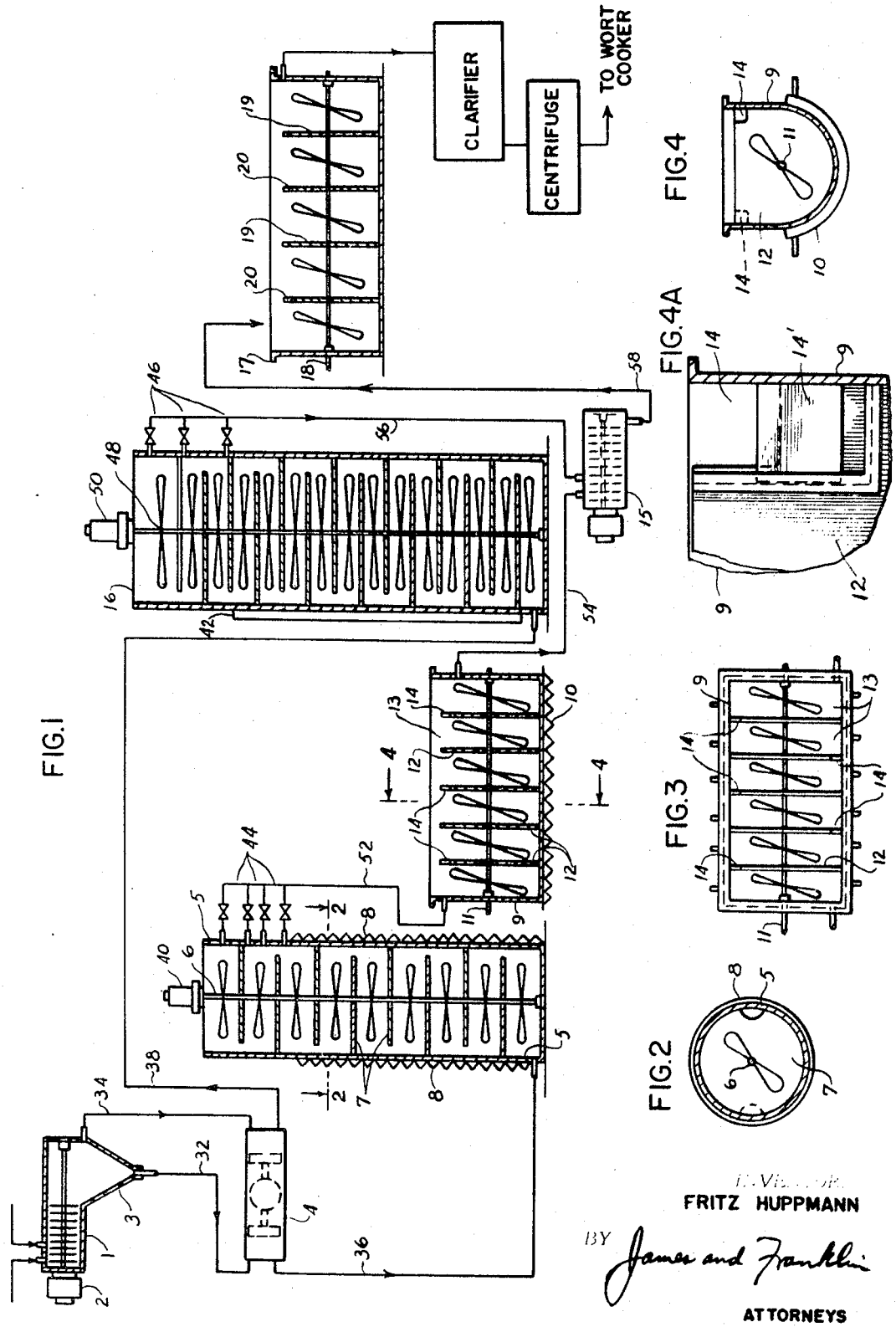

3,468,240
PLANT FOR THE CONTINUOUS PREPARATION OF BREWER'S MASH AND FOR THE COOKING OF WORT
Fritz Huppmann, 88 Eckrkamp, 2 Hamburg 64, Germany
Filed Sept. 20, 1967, Ser. No. 669,090
Int. Cl. C12c 7/10, 7/18
U.S. Cl. 99—276                                        18 Claims

ABSTRACT OF THE DISCLOSURE

The present apparatus is for the brewing of beer by a continuous process, instead of using large fixed vats. There is a vertical vessel or column with a mash inlet at the bottom and an outlet at the top. The vessel is divided into treatment zones by horizontal partitions with offset openings. An upright shaft extending all the way through the vessel carries stirrer blades between the partitions for each zone. In order to adjust the effective height of the vessel from inlet to outlet there are multiple outlets at somewhat different levels provided with valves so that one or another outlet may be selected for use. This vessel may be followed by a horizontal vat with vertical partitions having offset passages, and also having stirrers on a horizontal shaft. Two vertical vessels may be provided, one for thick mash and one for thin mash, and after treatment these mashes are recombined in desired proportion.

---

This invention relates to the brewing of beer, and more particularly to a continuous process for that purpose.

Beer has been produced up to now in an intermittent manner requiring very large vats. A continuous brewing process has not been used because of special difficulties encountered in a continuous process, in that the individual stages of the brewing and fermentation process must be adapted in time, since the biochemical enzymatic processes in the preparation of beer do not take place spontaneously, but require certain stay or dwell periods in the individual vats provided for the brewing and fermentation stages.

The general object of the present invention is to provide a continuous process which overcomes the said difficulty.

The present invention is based on the finding that the dwell periods of the brewing material necessary in a series-connected vat arrangement for the various known brewing stages may be regulated at certain temperatures in the vats provided for the individual stages, by the provision of suitable partitions, preferably arranged transverse to the direction of flow of the brewing material. The partitions form compartments or cells. The material in the cells is only gradually displaced from the individual cells by material arriving through offset or staggered openings provided in the partitions. Thus the time required for the individual brewing stages (protein arrest, sugaring, etc.), may be adjusted and regulated, despite the constant flow of the material through the plant, and without the vats having to be particularly large.

This fact, and also the continuous method of operation, have the result that the space requirement of a plant made according to this invention is much less than that of a known intermittently working brewery of the same capacity, because a plant made according to the invention may be in operation day and night without interruption. Compared to the usual intermittent or vat brewery, the energy balance in the present plant is favorable because the otherwise required high steam peaks in the brew house are replaced by a uniform continuous load. The electric power peaks can also be eliminated by the uniform continuous load of the drives and of the refrigerating plant. By complete recovery from the wort in the cooling of the wort, it is furthermore possible to produce the required hot water for the doughing-in and other needs in a brewery. Finally the continuous operation permits a fully automatic control of the brewing process.

Earlier proposals for plants for the continuous brewing of beer are known, but these were limited to the continuous operation of an individual stage, within the total brewing process. Thus proposals are known for the constructional design of the vessels used for the continuous cooking of the wort. However, a practical solution of the problem of how the individual stages can be combined to provide a continuous total process, was not heretofore found.

For example, a mashing process is known using series-connected fore-mashing, mashing and mash-cooking apparatus provided with stirrers, which are followed however, by intermittent clarifying and wort-cooking vessels. In such a plant, which works continuously only at the start, the problem of eliminating the energy peaks required in the preparation of the brew remain unsolved, because a suddenly rising energy requirement is due mainly to the fact that great evaporation outputs must be achieved, particularly in the cooking of the wort when the wort cooking vessel is filled in charges or batches. In addition, in the known mash preparation plant, apart from other important characteristics of the present plant, the dwell periods in the flow-through vessels are not tuned or adjusted appropriately to the material to be treated.

Similar consideration also applies to another plant for a mashing process suggested in the prior art, in which the stay period of the mash can be regulated by proportioning the volume of the vessels, but no provisions are made to prevent mixing of the mash in all stages. The absence of stirring mechanisms would result in a deposit of the heavy mash constituents, without preventing the mixing of mash portions of different treatment phases. Any partitions provided in the cooking vessels would not form cells connected with each other by overflow passages, and would not work according to the overflow principle but rather according to the communication principle, and would not prevent mixing between sections. Finally the previously suggested plant would have the disadvantage that it requires a plurality of vats which are open at the top, and thus require much space for the treatment of the mash alone, whereas according to the invention only four vertical closed vats are required for a two-mash process, for example, or in a modified form only one vertical closed vat is sufficient, which results in considerable savings in space, and effects in addition the forced charging of the mash by pump pressure into the last treatment cell.

Beyond that, a plant embodying the present invention meets at the same time the following requirements, in its individual stages, from the fore-mashing to the cooking of the wort:

(1) The dwell or stay periods of the brewing material can be regulated in the individual vessels in relation to the respective temperatures used;

(2) Mixing of the brewing material is prevented in the individual vats; but (3) Nevertheless the suspended particles are kept in suspension in the preparation of the mash.

A plant according to my invention for the continuous preparation of the mash and the cooking of the wort, in which the stay periods in the vats can be tuned to the material to be treated, is characterized by the fact that, first of all, the vats for the treatment of the mash before the after-treatment and cooking processes are designed as vertical vessels, closed on all sides and traversed from the bottom to the top. These upright vessels are divided by horizontal partitions with staggered openings, into individual treatment zones with regulatable temperature conditions of the mash, each being provided with a stirrer with the shaft arranged on the axis of the vessel, and with blades in each treatment zone. The height and therefore the treatment time is adjustable also. Second, the processing and cooking vessels arranged behind the mash vats are subdivided by vertical walls whose overflow passages are staggered from one side wall to the opposite side wall, or from bottom to top, the cross section or height of the overflow passages being variable by shutoff elements, for example adjustable slide valves, and each stirrer being provided with shafts arranged in the axis of the vessel, and with blades in each treatment cell. Third, the wort cooking vessel arranged horizontally, and subdivided by vertical partitions with staggered overflow passages, is equipped in the lower part and/or in the partitions with heating ducts for a heat-carrying medium such as steam.

To accomplish the foregoing general objects, and other more specific objects which will hereinafter appear, my invention resides in the apparatus elements and their relation one to another, as are hereinafter more particularly described in the following specification. The specification is accompanied by drawings in which:

FIG. 1 is a semischematic flow chart of a plant with separate mash treatment vessels for thick and thin mash;

FIG. 2 is a horizontal section taken on the line 2—2 of FIG. 1;

FIG. 3 is a top view of a mash-treatment and cooking vessel shown between the two vertical vessels in FIG. 1;

FIG. 4 is a vertical section through the mash-treatment and cooking vessel, taken on the line 4—4 in FIG. 1;

FIG. 4A is explanatory of a detail;

FIG. 5 shows a simplified embodiment of a plant requiring only a single vertical mash-treatment vessel or column for thick and thin mash, and two horizontal processing and cooking vessels, for a two-mash process;

FIG. 5A shows a modification of the mash cooking vessel;

FIG. 6 is a vertical longitudinal section showing a wort cooking vessel;

FIG. 7 is a vertical section taken on the line 7—7 in FIG. 6;

FIG. 8 is a top view of the wort cooking vessel of FIG. 6;

FIG. 9 is a vertical longitudinal section showing another embodiment of the wort cooking vessel; and FIG. 10 shows the elements of FIG. 1 doubled for a two mash or two stage process using four columns.

As can be seen from FIG. 1, the doughing-in vessel 1, which at the start of the mesh treatment holds a certain amount of water and malt, is equipped with a beater mechanism driven by a motor 2. The resulting mixture flows from the beater into a settling tank 3, which has a conical lower part. From this settling tank 3 the thick mash is withdrawn at the bottom, and the thin mash is withdrawn at the top. The thick and thin mashes are then fed through pipes 32 and 34 to a dosing device 4 which is adjustable and which regulates the ratio in which the two mashes are used in the further brewing process. This is important because the mashing process can thus be made variable according to the respective requirements.

The dosing device 4 may be designed as a double pump and acts at the same time as a conveyor or circulating means for the brewing material in the plant, and maintains the pressure gradient necessary for the transportation of the material through the plant. The thick mash is discharged in pipe 36, and the thin mash in pipe 38.

The thick mash is introduced by pipe 36 at the foot of a vertical vat 5, which is equipped with a heating device here shown for example as heating coils 8, a stirrer 6 driven by a motor 40, and partitions 7. The partitions have openings which alternate from one side of the vat to the other, as shown in the drawing, FIGS. 1 and 2, so that the mash dwells and is stirred in each of the cells forms by the partitions 7. One form of opening is shown in FIG. 2. In this vat the thick mash to be processed is treated. When passing through the vat 5, the mash is subjected to predetermined time and temperature intervals corresponding to the mashing process desired to be used (protein arrest, sugaring arrest).

The second vertical vat 16 is used for the treatment of the thin mash, and corresponds in design to the vat 5, but with the difference that the vat 16 is larger, corresponding to and because there is a greater proportion of thin mash. Also vat 16 has a smaller heating device, indicated at 42, and this need not be in zones with different temperatures, as is wanted for heaters 8 on column 7. On the vats 5 and/or 16 suitable extraction devices are provided, for example, tap lines 44 and 46 at different levels, which make it possible to regulate or change the filling volume or height used in the vats, and thus to regulate the entire timing or dwell period of the mash in the vats. Thermostats may be provided for regulating the temperature in the vats 5 and 16. Usually the path of flow through the vats 5 and 16 will be made longer by using an upper tap when the doughing-in or starting temperature is lower. Vat 16, like vat 5, has a stirrer 48 driven by a motor 50. It also has partitions with openings at alternate sides of the vat.

The thick mash leaves the vat 5 through pipe 52 at a temperature several degrees below the boiling point, and is delivered to the mash cooking vessel 9, which is arranged horizontally, and is provided with suitable heating devices, for example, heating ducts 10 arranged on the bottom. These preferably run crosswise, and have individual controls so that the temperature in each cell may be regulated independently of that in another cell. The vessel 9 also has a stirrer 11 driven by a motor which is not shown. The vat 9 is divided into different cells 13 by partitions 12 arranged in the direction of flow of the thick mash in the mash cooking vessel 9. The thick mash, which is at cooking temperature, is displaced constantly from the cells 13 by the incoming material, and flows through overflow passages 14 provided in the partitions 12. FIGS. 3 and 4 show how the overflow passages of the partitions are arranged alternately on one or the other side wall of the vat, that is, they are staggered for zig zag flow. This has the effect that parts of the mash, as subdivided for a time in each of the cells 13, is subjected as uniformly as possible to the desired temperature and time intervals for that cell, without excessive mixing as between cells.

The height and therefore the dwell in each cell may be regulated, as by vertically movable slides 14' shown in FIG. 4A at the openings 14. These are omitted in other figures of the drawing to simplify the drawing, but are preferably used at all such passages.

The mash, which is at boiling temperature, flows from the cooking vessel 9 by way of pipe 54 into a mixing vessel 15. Here it meets the thin mash which was kept in the vat 16 at the doughing-in temperature, or was preheated to a desired higher temperature during its passage by heater 42. The thin mash flows from a tap 46 selected by opening a desired one of the valves, through a pipe 56.

In a two-mash process, the mixed mash leaving the mixing vessel 15 by pipe 58 is again subdivided and supplied to a treatment vessel like the upright vat 5 and an arrest vessel like the upright vessel 16 shown in FIG. 1, and the parts again combined at the end of the passage in another mixing vessel like the vessel 15 in FIG. 1. This is shown schematically in FIG. 10. In FIG. 10 the left hand part of the apparatus including the columns 5 and 16 correspond to what is shown in FIG. 1, and the right hand part of FIG. 10 represents similar apparatus repeated for a two-mash process. Thus the part 201 is a doughing-in vessel; the part 204 is an adjustable dual pump acting as a dosing device; the columns 205 and 216 correspond to the columns 5 and 16 and are for thick mash and thin mash respectively; the mash cooking vessel 209 corresponds to the vessel 9; and the mixing vessel 215 corresponds to the mixing vessel 15 in FIG. 1. Its discharge pipe is followed by an after-sugaring vessel and a clarifier and a centrifuge, as in FIG. 1.

This arrangement may be repeated again for a three-mash process, so that the temperature of the mixed mash rises successively to the so-called finish-mashing temperature which may be about 70 degrees centigrade. For simplicity's sake the intermediate stages of the above mentioned mashing process are not represented in FIG. 1. It is obvious, however, that the plant according to the invention does not undergo any fundamental changes in the individual mashing stages, as will be seen in FIG. 10 for two stages.

Vertical adjustment of an overflow passage determines the volume of the compartment, and with stirring the dwell of the mash in a compartment is longer when the volume is larger. Thus the control time of treatment at each temperature zone or compartment is adjustable, despite the fact that the rate of flow is the same. The earlier zones may be adjusted higher for longer treatment, by using slides like the slides 14' shown in FIG. 4A.

A different arrangement of the plant is shown in FIG. 5. This is of advantage for compactness, particularly for a multiple mash process. The example shown in FIG. 5 is for a two-mash method, but only a single column is used even for a three-mash process.

The part of the plant shown in FIG. 5 replaces the parts shown in FIG. 10, for a two-mash process. The entire mash is fed from the beater to the foot of a tall vertical vat 105, again provided with a stirrer 106, partitions 107, and heating devices 108. At different levels of the vat 105, that is, in different temperature zones of the vat, I provide tap lines 121 and 221 through which the partial mashes branched off from the vat 105 are fed to the horizontal processing vessels 109 and 209, from which return lines 122 and 222 serve to return the processed partial mashes from the vats 109 and 209 into the vat 105. Circulation is assured by pumps 241 and 242. The temperature may be read on gauges 243 and 244. The arrangement of the branch lines 121 and 221 and return lines 122 and 222 depends on which mashing method is used. The same holds true for the number of tap lines and return lines connected with the vat 105, and thus also for the number of processing or cooking vessels 109, 209 used. If, for example, one works according to the three-mash method instead of the two-mash method, three partial mashes must be withdrawn at certain levels from the vat 105, and returned again to the latter after treatment in three horizontal vats like the vats 109 and 209.

In FIG. 5 the column may be followed by an after-sugaring vessel corresponding to the vessel 17 in FIG. 1, but for greater compactness the uppermost compartments in the column, in this case the top three compartments, may themselves be used as an after-sugaring vessel, in which case the pipe 271 would lead directly to a clarifier and a centrifuge and a wort cooker, without need for a horizontal after-sugaring vessel like that shown at 17 in FIG. 1. The valves 270 for adjustable height are not used when the top of the column is used for after-sugaring.

In a typical case the temperature of the mixture entering at the bottom of the column may be say 45° C.; the temperature in the region between pipes 121 and 122 may be say 52° C., the temperature in the region between the pipes 122 and 222 may be say 64° C.; and the temperature above the pipe 222 at the top of the column may be say 78° C. In the horizontal vats 109 and 209 the temperature increases from say 60° C. at the leftmost compartment, to say 100° C. at the right hand compartment. It will therefore be seen that the cooked mash when pumped back into the mash tower helps warm up the mash in the tower.

The specified temperatures are given solely by way of example and are not intended to be in limitation of the invention. The desired temperatures may be measured by means of suitable temperature responsive elements inserted at desired points and acting to control the heating of the zones. Such temperature control mechanism is itself well known and is not here illustrated.

As so far described the overflow passages in the vertical partitions of the horizontal vessels have alternated from side to side, but they can also alternate from top to bottom, and such an arrangement is shown in FIG. 5A in which the horizontal mash cooking vessel 250 is heated in zones by means of transverse heating passages represented by the zig zag line 251, so that the different compartments formed by the vertical partitions may be independently controlled as to temperature. There is a motor-driven horizontal shaft 252 which carries a stirrer for each compartment, all as previously described. However, in this case the partition 253 has a passage 254 at the bottom, while the next partition 255 has a passage 256 at the top and the next partition 257 has a passage 258 at the bottom, and so on. The passages are preferably made adjustable by means of vertically movable slide plates, indicated at 259 and 260.

In preferred form even the partitions which have a top passage are also provided with a bottom passage, shown at 261, these bottom passages usually being completely closed, as by means of a slide plate 262. Such bottom passages have the advantage of permitting drainage of the vessel, without waste of the mash therein, as would be the case if flushed out with water in the absence of bottom passages.

It will be understood that the use of alternating top and bottom passages, instead of side to side passages, is applicable to the vessels shown in either FIG. 1 or FIG. 5, and also to FIGS. 6 and 9.

Before the mixed mash is fed for clarification to a continuous clarifying plant (not shown in FIG. 1 and FIG. 5), it arrives by way of pipe 58 (FIG. 1), or pipe 246 (FIG. 5), in an after-sugaring vessel 17 (FIG. 1), which is provided with a stirrer 18 driven by a motor, not shown, and with partitions 19. The overflow passages 20 of the partitions 19 are arranged at alternate sides in the manner described in connection with the mash cooking vessel 9, and they serve again to insure a reduced mixing as between the different compartments. The passages may have slides for vertical adjustment, as in FIG. 4A. The flow passages also may be staggered up and down, as in FIG. 5A, instead of from side to side.

The clear wort issuing from the centrifuges, not shown, arranged to follow the clarifying plant, is fed to a wort cooking vessel. FIGS. 6 through 9 show the wort cooking vessel where the clear wort is boiled, usually with added hops. Inasmuch as this is only a boiling step it is not necessary to divide these vessels into heating zones of different temperature. The heating jacket may be transverse or longitudinal or may consist of coils, it being evident that different zones are needed only where different temperatures are needed, but not as here for simple boiling.

The vessel 23 in FIG. 6 is arranged horizontally, and is divided into a plurality of cells 25 by the partitions 24 arranged transverse to the direction of flow of the wort. The wort, which is brought to a boil, traverses the series-connected cells 25 through the overflow passages 114 provided in the partitions 24. These again are arranged alternately at opposite sides as shown in FIGS. 7 and 8, and may have slides. They can also be located at the top and bottom as in FIG. 5A. As can be seen from FIGS. 7 and 8, the bottom of the vat 23 is equipped with passages or a jacket 125 through which steam is conducted for heating the vat 23. During the passage of the clear wort through the wort-cooking vessel, hops may be added to the wort from hop throwers 27 arranged above the vat 23. These may be fully automatic, and serve at the same time as a dosing device for the hops.

In order to obtain good cooking and thus also coarse-flaked hot dregs, some of the partitions 124 may be provided with heating tubes 26 shown in FIG. 9. The heating tubes or jacket provided on the bottom may also be maintained, as shown at 225. The dividing partitions can be designed as worm coils which permit a continuous passage. The spent hops issuing from the vat 23 are separated in known manner and the wort is then fermented. The overflow passages 214 again alternate at opposite sides of the vat, and also could alternate at the top and bottom of the vat. The fermenting may be in apparatus as described in my copending application Ser. No. 572,091, filed Aug. 12, 1966.

As mentioned above, it is important in a plant for continuous brewing, that the dwell periods necessary for the individual states of the entire process may be regulated without appreciable mixing with the following material, for which purpose the vats are provided with suitable partitions, preferably arranged transverse to the direction of flow of the material, which partitions in turn are provided with overflow passages for the material. The passages are preferably adjustable. The temperatures are also independently adjustable.

It is believed that the construction and method of use of my improved apparatus for the continuous brewing of beer, as well as the advantages thereof, will be apparent from the foregoing detailed description. It also will be apparent that while I have shown and described the apparatus in some preferred forms, changes may be made without departing from the scope of the invention, as sought to be defined in the following claims.

I claim:

1. A plant for the continuous preparation of brewer's mash comprising a vat in the form of a vertical vessel which is closed on all sides, an inlet for mash at the bottom of the vessel and an outlet for mash at much higher level whereby the vessel is filled with mash from the inlet to the outlet and the flow of mash in the vessel is from the bottom upward, said vessel being divided into individual treatment zones by horizontal partitions with relatively offset or staggered openings, and a stirrer with an upright shaft having stirrer blades between the partitions for each zone for mixing the mash in that zone.

2. A plant as defined in claim 1, in which there are a plurality of outlets for the mash arranged at different levels in the upper part of the vessel and provided with valves whereby one or another outlet may be selected for use at a desired level for selection of the effective height of the mash from inlet to outlet, for adjustment of the treatment of the mash.

3. A plant as defined in claim 2, in which there is a horizontal vat for the cooking of mash or wort, said horizontal vat being subdivided by vertical partitions, alternate partitions having overflow passages at opposite parts of the vat, means to heat said vat, and means to connect the outlet from the upright vessel to the vat.

4. A plant as defined in claim 3, in which the overflow passages at the top of a partition are adjustable in height.

5. A plant as defined in claim 4, in which the horizontal vat has a stirrer shaft with stirrer blades between the partitions to mix the mash in each of the compartments formed by the partitions.

6. A plant as defined in claim 5, in which there is a beater, and in which there are two vertical vessels, one for thick mash and one for thin mash, and in which the mixture at the beater is separated into thick mash and thin mash for supply to the upright vessels, and in which the discharge of the two vessels is recombined in a mixing vessel.

7. A plant as defined in claim 6 in which there is a means to regulate the proportion or division of thick mash and thin mash.

8. A plant as defined in claim 7, in which there are additional upright vessels and additional horizontal cooking vats for repeated treatment of the mash in a two-mash process or a three-mash process, as desired.

9. A plant as defined in claim 5, in which the mash treated in a horizontal vat is returned to the upright vessel at a higher level, and in which the mash is withdrawn from the upright vessel at a still higher level for further treatment in another horizontal cooking vat, and so on.

10. A plant as defined in claim 1, in which there is a horizontal vat for the cooking of mash or wort, said horizontal vat being subdivided by vertical partitions, alternate partitions having overflow passages at opposite parts of the vat, means to heat said vat, and means to connect an outlet from the upright vessel to the vat.

11. A plant as defined in claim 10, in which the horizontal vat has a stirrer shaft with stirrer blades between the partitions to mix the mash in each of the compartments formed by the partitions.

12. A plant as defined in claim 11, in which there are additional upright vessels and additional horizontal cooking vats for repeated treatment of the mash in a two-mash process or a three-mash process, as desired.

13. A plant as defined in claim 11, in which the mash treated in a horizontal vat is returned to the upright vessel at a higher level, and in which the mash may be withdrawn from the upright vessel at a still higher level for further treatment in another horizontal cooking vat, and so on.

14. A plant as defined in claim 13 in which the uppermost zones of the upright vessel act as an after-sugaring vessel.

15. A plant as defined in claim 1, in which there is a horizontal vat for the cooking of wort, said horizontal vat being subdivided by vertical partitions, alternate partitions having overflow passages at opposite parts of the vat, said passages being adjustable in dimension, means to heat said vat, and means to connect an outlet from the upright vessel to the vat.

16. A plant as defined in claim 1, in which there is a beater, and in which there are two vertical vessels, one for thick mash and one for thin mash, and in which the mixture at the beater is separated into thick mash and thin mash for supply to the upright vessels, and in which the discharge of the two vessels is recombined in a mixing vessel.

17. A plant as defined in claim 1, in which there are additional upright vessels for repeated treatment of the mash in a two-mash process, or a three-mash process, as desired.

18. A plant as defined in claim 1, in which there is a beater, and in which there are two vertical vessels, one for thick mash and one for thin mash, and in which the mixture of the beater is separated into thick mash and thin mash for supply to the upright vessels, and in which there is a means to regulate the proportion of thick and thin mash supplied to the vessels, and in which the discharge of the two vessels is recombined in a mixing vessel.

References Cited

UNITED STATES PATENTS

| 444,152 | 1/1891 | Madlener | 99—277.2 |
| 1,776,325 | 9/1930 | Robinson | 259—66 |
| 3,045,984 | 7/1962 | Cochran | 259—4 |
| 3,236,173 | 2/1966 | Wohleb | 99—278 |
| 3,249,443 | 5/1966 | Reiter | 99—278 X |

ROBERT W. JENKINS, Primary Examiner